US012675863B2

(12) United States Patent
Sweda et al.

(10) Patent No.: US 12,675,863 B2
(45) Date of Patent: Jul. 7, 2026

(54) METHOD AND APPARATUS FOR ANALYZING AND PREDICTING FUTURE DEGRADATION OF GAS TURBINE ENGINE COMPONENTS AND DETERMINING IF COMPONENTS MADE FROM COUNTERFEIT MATERIALS

(71) Applicant: RTX CORPORATION, Farmington, CT (US)

(72) Inventors: Timothy Sweda, Lexington, CT (US); Adam Knapp, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 302 days.

(21) Appl. No.: 18/605,070

(22) Filed: Mar. 14, 2024

(65) Prior Publication Data

US 2025/0292379 A1     Sep. 18, 2025

(51) Int. Cl.
*G06T 7/00*        (2017.01)
*F01D 21/00*       (2006.01)
*G08B 21/18*       (2006.01)

(52) U.S. Cl.
CPC .......... *G06T 7/0002* (2013.01); *F01D 21/003* (2013.01); *G08B 21/18* (2013.01); (Continued)

(58) Field of Classification Search
CPC ......... G06T 7/0002; G06T 2207/20084; G06T 2207/10016; G06T 7/0004; (Continued)

(56) References Cited

U.S. PATENT DOCUMENTS 7,489,811 B2 *   2/2009   Brummel ........... G01N 21/8806
                                                     382/152
8,606,597 B2 *  12/2013   Sato ........................ G06F 16/51
                                                     396/17
(Continued)

FOREIGN PATENT DOCUMENTS

| CN | 113868964 | 12/2021 |
| CN | 116701943 | 9/2023 |
| KR | 20220127886 | 9/2022 |

OTHER PUBLICATIONS

Lew et al., "DeepBuckle: Extracting physical behavior directly from empirical observation for a material agnostic approach to analyze and predit buckling", Massachusetts Institute of Technology, Journal of the Mechanics and Physics of Solids, 2022.

(Continued)

*Primary Examiner* — Van D Huynh
(74) *Attorney, Agent, or Firm* — Carlson, Gaskey & Olds, P.C.

(57) ABSTRACT

A method for a component of a gas turbine engine includes obtaining images of the component for a plurality of sequential inspection time periods, at least a portion of the images depicting degradation of the component. A first machine learning model (MLM) includes an input layer, an output layer, and a latent space therebetween. The latent space includes a plurality of clusters of nodes corresponding to respective image features. The method includes, for a plurality of the inspection time periods, utilizing the first MLM to determine which one or more of the clusters of the latent space the image most closely aligns with. The method also includes, for a plurality of the inspection time periods, utilizing a second MLM, which is a different type of MLM than the first MLM, to predict, based on the latent space of the first MLM, a degradation of the component that will occur prior to a subsequent one of the inspection time (Continued)

periods. The method includes determining a difference between the prediction and the image of the component from said subsequent one of the inspection time periods, and providing a notification to a user based on the difference. A system for analyzing degradation of a component of a gas turbine engine is also disclosed.

20 Claims, 7 Drawing Sheets

(52) U.S. Cl.
CPC ...... *F05D 2260/80* (2013.01); *F05D 2260/81* (2013.01); *G06T 2207/20084* (2013.01)

(58) Field of Classification Search
CPC ........ G06T 2207/30164; F01D 21/003; G08B 21/18; F05D 2260/80; F05D 2260/81; G06V 2201/06; G06V 10/82; G06V 20/52; G06N 3/044; G06N 3/045; G06N 3/047; G06N 3/084; G06N 3/088
See application file for complete search history.

(56) References Cited

U.S. PATENT DOCUMENTS

| | | | | |
|---|---|---|---|---|
| 9,476,798 | B2 * | 10/2016 | Pandey | ................. G01M 15/14 |
| 10,268,913 | B2 | 4/2019 | Lim et al. | |
| 11,307,570 | B2 | 4/2022 | Trinh | |
| 2017/0300605 | A1 * | 10/2017 | Ardis | .................. G05B 23/024 |
| 2019/0082943 | A1 * | 3/2019 | Mitsunaga | ......... A61B 1/00006 |
| 2023/0400846 | A1 | 12/2023 | Abbasi et al. | |
| 2025/0036825 | A1 * | 1/2025 | Kothari | ................. B29C 64/357 |
| 2025/0060679 | A1 * | 2/2025 | Barbieri | ................. G06N 3/096 |

OTHER PUBLICATIONS

Maged et al., "Variational AutoEncoders-LSTM based fault detection of time=dependent high dimensional processes", International Journal of Production Research, vol. 62, No. 4, pp. 1092-1107, Feb. 9, 2023.
Fährmann et al., "Lightweight long short-term memory variational auto-encoder for multivariate time series anomaly detection in industrial control systems", Sensors, vol. 22, No. 8, pp. 2886, Apr. 9, 2022.
The Extended European Search Report for European Patent Application No. 25162179.3 dated Jul. 15, 2025.

* cited by examiner

METHOD AND APPARATUS FOR ANALYZING AND PREDICTING FUTURE DEGRADATION OF GAS TURBINE ENGINE COMPONENTS AND DETERMINING IF COMPONENTS MADE FROM COUNTERFEIT MATERIALS

BACKGROUND

This application relates to predicting degradation of components of a gas turbine engine and determining whether the components are made from a counterfeit material.

Gas turbine engines are known and typically include a fan delivering air into a bypass duct for propulsion. The fan also delivers air into a compressor where air is compressed and delivered into a combustor. The air is mixed with fuel and ignited. Products of this combustion pass downstream over turbine rotors driving them to rotate. The turbine rotors, in turn, rotate compressor rotors and the fan rotor. It is known that various components of a gas turbine engine (e.g., turbine blades) may experience degradation over time, and such components are periodically inspected to monitor such degradation and determine when components should be replaced.

It is known to use finite element analysis (FEA) to analyze the stresses that a component of a machine (such as a gas turbine engine) is subjected to. However, FEA is dependent on assumptions, such as physics models and materials constants, which may be inaccurate, and FEA cannot predict future values (e.g., future degradation of a component). Predicting future values is useful because parts should be replaced if it is likely they will have unacceptable degradation before the next inspection cycle.

Certain gas turbine engine components have certain materials requirements that may be difficult and expensive to achieve, such as yield strength and tensile strength. There have been known instances of suppliers using counterfeit materials (i.e., materials that are claimed to meet, but do not meet, all of the materials requirements) for components. Use of such materials is difficult to detect, but could adversely affect the life of the component made from the material. Also, use of a counterfeit material may adversely affect the accuracy of FEA, because one or more assumed materials constants may differ from their expected values.

SUMMARY

A method for a component of a gas turbine engine according to an example embodiment of the present disclosure includes obtaining images of the component of the gas turbine engine for a plurality of sequential inspection time periods, at least a portion of the images depicting degradation of the component. A first machine learning model (MLM) includes an input layer, an output layer, and a latent space therebetween. The latent space includes a plurality of clusters of nodes corresponding to respective image features. The method includes, for a plurality of the inspection time periods, utilizing the first MLM to determine which one or more of the clusters of the latent space the image most closely aligns with. The method also includes, for a plurality of the inspection time periods, utilizing a second MLM, which is a different type of MLM than the first MLM, to predict, based on the latent space of the first MLM, a degradation of the component that will occur prior to a subsequent one of the inspection time periods. The method includes determining a difference between the prediction and the image of the component from the subsequent one of the inspection time periods, and providing a notification to a user based on the difference.

In a further embodiment of the foregoing embodiment, the latent space of the first MLM includes a bottleneck, an encoder portion, and a decoder portion. The encoder portion is disposed between the input layer and the bottleneck, and the decoder portion is disposed between the bottleneck and the output layer. The utilizing the first MLM includes utilizing the encoder portion, but not the decoder portion, to determine which one or more of the clusters of the latent space the image most closely aligns with.

In a further embodiment of any of the foregoing embodiments, utilizing the second MLM to predict the degradation includes predicting a location in the latent space that represents a predicted condition of the component during the subsequent one of the inspection time periods.

In a further embodiment of any of the foregoing embodiments, the method includes using the decoder portion of the first MLM to generate an image depicting the predicted condition based on the location in the latent space.

In a further embodiment of any of the foregoing embodiments, the utilizing the second MLM includes, for a particular inspection time period, utilizing the image for the particular inspection time period and the images from n preceding inspection time periods to predict the degradation that will occur prior to the subsequent one of the inspection time periods, where n is greater than or equal to 1.

In a further embodiment of any of the foregoing embodiments, the method includes determining, based on one or more of the differences, whether the component is likely composed of a counterfeit material, and the notification includes a notification of whether the component is likely composed of a counterfeit material.

In a further embodiment of any of the foregoing embodiments, the determining, based on one or more of the differences, whether the component is likely composed of a counterfeit material, includes determining that a first plurality of the differences for a first subset of the inspection time periods are within a predefined margin error and determining that a difference determined for one of the inspection time periods that is subsequent to the first subset of inspection time periods is outside the predefined margin of error.

In a further embodiment of any of the foregoing embodiments, the method includes determining, based on one or more of the predictions, whether the component should be preemptively removed from the gas turbine engine, and the notification includes a notification of whether the component should be preemptively removed from the gas turbine engine.

In a further embodiment of any of the foregoing embodiments, the first MLM includes a variational autoencoder, and the second MLM includes a long short term memory (LSTM) model.

In a further embodiment of any of the foregoing embodiments, the degradation includes one or both of crack formation and crack propagation.

A system for analyzing degradation of a component of a gas turbine engine according to an example embodiment of the present disclosure includes processing circuitry operatively connected to memory. The processing circuitry is configured to obtain images of the component of the gas turbine engine for a plurality of sequential inspection time periods, at least a portion of the images depicting degradation of the component. A first machine learning model (MLM) includes an input layer, an output layer, and a latent space therebetween. The latent space includes a plurality of clusters of nodes corresponding to respective image features. The processing circuitry is configured to, for a plurality of the inspection time periods, utilize the first MLM to determine which one or more clusters of the latent space the image most closely aligns with. The processing circuitry is also configured to utilize a second MLM, which is a different type of MLM than the first MLM, to predict, based on the latent space of the first MLM, a degradation of the component that will occur prior to a subsequent one of the inspection time period. The processing circuitry is also configured to determine a difference between the prediction and the image of the component from the subsequent one of the inspection time periods, and provide a notification to a user based on the difference.

In a further embodiment of the foregoing embodiment, the latent space of the first MLM includes a bottleneck, an encoder portion, and a decoder portion. The encoder portion is disposed between the input layer and the bottleneck, and the decoder portion is disposed between the bottleneck and the output layer. The processing circuitry is configured to utilize the encoder portion, but not the decoder portion, to determine which one or more of the clusters of the latent space the image most closely aligns with.

In a further embodiment of any of the foregoing embodiments, to utilize the second MLM to predict the degradation, the processing circuitry is configured to predict a location in the latent space that represents a predicted condition of the component during the subsequent one of the inspection time periods In a further embodiment of any of the foregoing embodiments, the processing circuitry is configured to use the decoder portion of the first MLM to generate an image depicting the predicted condition based on the location in the latent space.

In a further embodiment of any of the foregoing embodiments, to utilize the second MLM to predict the degradation, the processing circuitry is configured to, for a particular inspection time period, utilize the image for the particular inspection time period and the images from n preceding inspection time periods to predict the degradation that will occur prior to the subsequent one of the inspection time periods, where n is greater than or equal to 1.

In a further embodiment of any of the foregoing embodiments, the processing circuitry is configured to determine, based on one or more of the differences, whether the component is likely composed of a counterfeit material, and the notification includes a notification of whether the component is likely composed of a counterfeit material.

In a further embodiment of any of the foregoing embodiments, to determine, based on one or more of the differences, whether the component is likely composed of a counterfeit material, the processing circuitry is configured to determine that a first plurality of the differences for a first subset of the inspection time period are within a predefined margin error and determine that a difference determined for one of the inspection time periods that is subsequent to the first subset of inspection time periods is outside the predefined margin of error.

In a further embodiment of any of the foregoing embodiments, the processing circuitry is configured to determine, based on one or more of the predictions, whether the component should be preemptively removed from the gas turbine engine, and the notification includes a notification of whether the component should be preemptively removed from the gas turbine engine.

In a further embodiment of any of the foregoing embodiments, the first MLM includes a variational autoencoder, and the second MLM includes a long short term memory (LSTM) model.

In a further embodiment of any of the foregoing embodiments, the degradation includes one or both of crack formation and crack propagation.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
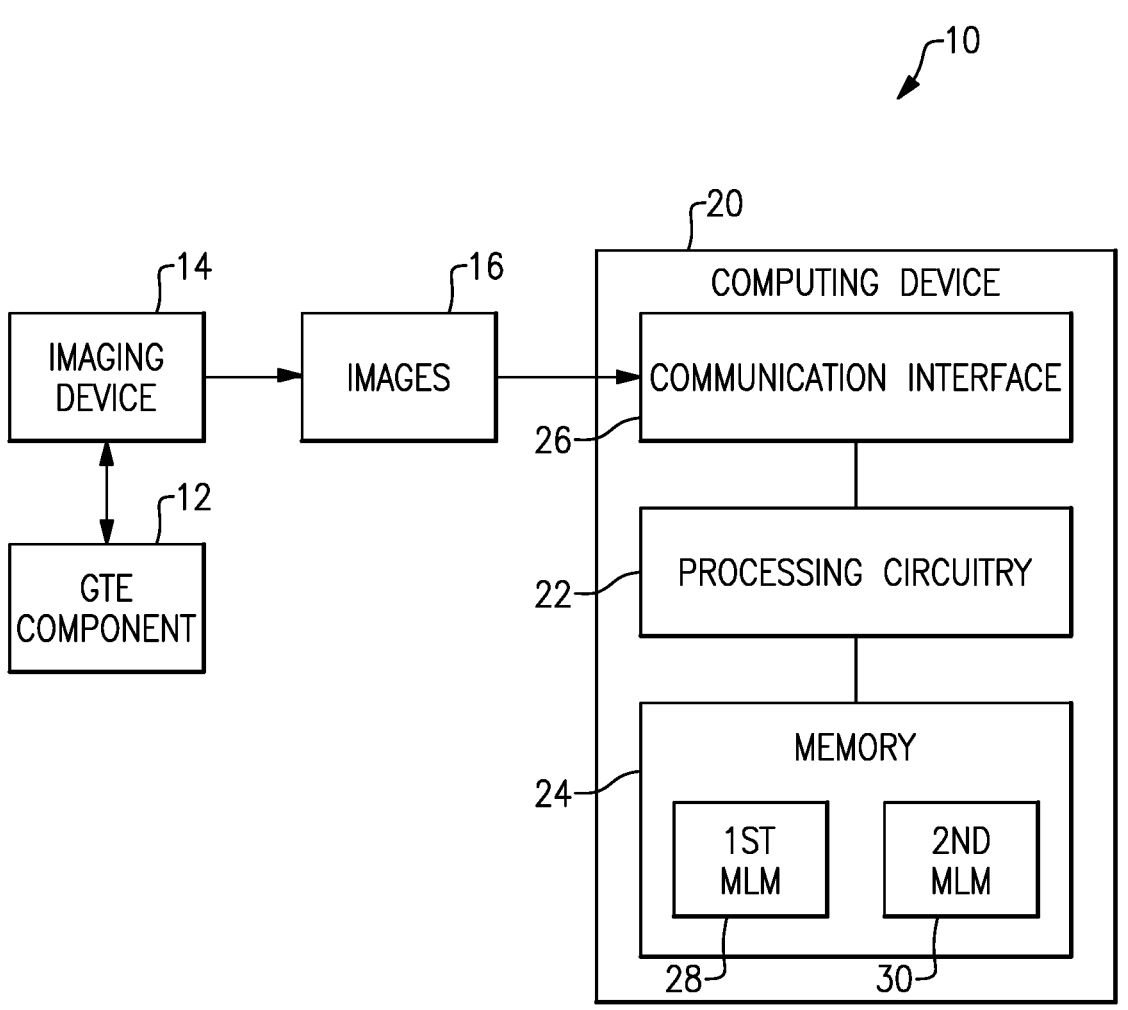
FIG. 1 is a schematic view of an example system for analyzing and predicting future degradation of a component of a gas turbine engine and determining if components are likely made from a counterfeit material.

FIG. 1 is a schematic view of an example system 10 for analyzing and predicting degradation of a component 12 of a gas turbine engine (the component 12 may also referred to as a "part" of the gas turbine engine) and determining if the component 12 is likely made from a counterfeit material. An imaging device 14 (e.g., a camera, microscope, boroscope, or x-ray imaging device) records images 16 of the component 12 (e.g., photographs, microscope images, or boroscope images) for a plurality of inspection time periods, and provides the images 16 to a computing device 20 for analysis and degradation prediction (e.g., prediction of crack propagation).

The computing device 20 includes processing circuitry 22 operatively connected to memory 24 and a communication interface 26. The processing circuitry 22 may include one or more microprocessors, microcontrollers, application specific integrated circuits (ASICs), or the like, for example. Although the processing circuitry 22 is depicted as being within a single computing device 20, it is understood that it could be distributed across multiple computing devices.

The memory 24 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 24 may incorporate electronic, magnetic, optical, and/or other types of storage media. The memory 24 can also have a distributed architecture, where various components are situated remotely from one another, but can be accessed by the processing circuitry 22.

The communication interface 26 facilitates communication between the computing device 20 and other devices, such as imaging device 14, or other computing devices. The communication interface may be configured for wired and/or wireless communication, for example.

The memory 24 includes a first machine learning model (MLM) 28 of a first type, and a second MLM 30 of a second type that is different than the first type. The first MLM 28 is a model is trained to recreate images (such as an autoencoder or variational autoencoder), and the second MLM 30 is a model that predicts time-based sequences (such as a neural network, and in particular, a "long short term memory" (LSTM) model). A primary objective of the first MLM 28 is to learn how to recreate one or more physical phenomena (e.g., crack propagation) over time and cluster similar inputs together in a latent space of the first MLM 28, and a primary objective of the second MLM 30 is to predict future degradation of the component 12 over time utilizing the latent space of the first MLM 28.

Figure 2A:
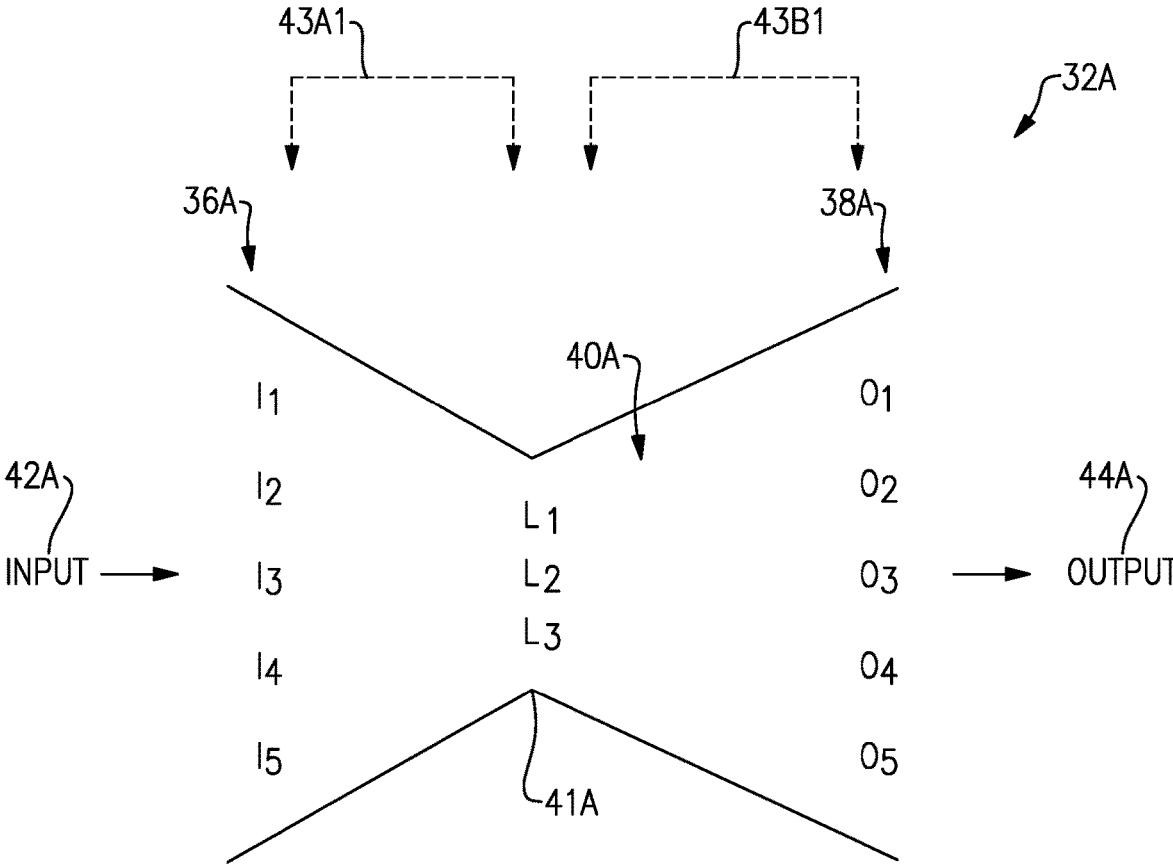
FIG. 2A is a schematic view of a variational autoencoder (VAE) machine learning model (MLM) that may be used in the system of FIG. 1.

FIG. 2A is a schematic view of an example variational autoencoder (VAE) 32A MLM, which may be used as the first MLM 28 of FIG. 1. The VAE 32A includes an input layer 36A (schematically shown with nodes $I_1$-$I_5$), an output layer 38A (schematically shown with nodes 01-05), and a latent space 40A therebetween (schematically shown with nodes $L_1$-$L_3$). The VAE 32A includes a "bottleneck" 41A, first half 43A1 (also known as an "encoder portion" or just "encoder"), and second half 43B1 (also known as a "decoder portion" or just "decoder"). The "bottleneck" 41A is a region having a reduced dimensionality (e.g., a lowest dimensionality of the VAE 32A) compared to the input layer 36A output layer 38A. As shown, the dimensionality decreases from input layer 36A towards the bottleneck 41A, and then increases from the bottleneck 41A towards the output layer 38A. The bottleneck 41A separates the first half 43A1 (i.e., the encoder) and the second half 43B1 (i.e., the decoder).

In the schematic, simplified representation of FIG. 2A, the latent space is depicted as a single layer of nodes, but it is understood that any number of layers could be used in the latent space 40A, and that a plurality of layers would be included in the latent space 40A. The VAE 32A is configured to receive an image input 42A, to encode the image into the latent space 40A using the encoder, and to reconstruct the input 42A as an image output 44A using the decoder.

VAEs are generative models that simultaneously learn to encode and decode data. By training VAEs on high-dimensional data, such as images, the VAE 32A learns to encode the data into a compact latent representation. VAEs are known for their ability to generate new data samples from the learned latent space. VAEs also commonly have a relatively large input, relatively large output, and a relatively smaller latent space, such that they are characterized by a sideways hourglass shape, as shown in FIG. 2.

Figure 2B:
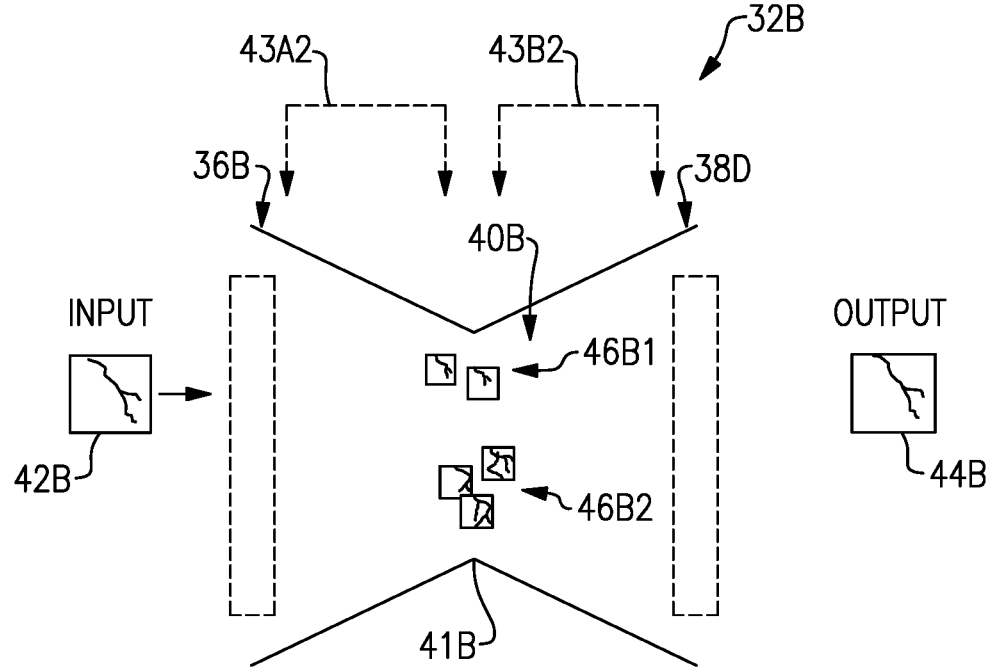
FIG. 2B is a schematic view of a VAE MLM trained to detect degradation of a gas turbine engine component.

FIG. 2B is a schematic view of a VAE 32C trained to detect degradation of a gas turbine engine component 12. The latent space 40B of the VAE 32B includes a first cluster 46B1 representing nodes corresponding to images where cracks are acceptable (i.e., a component 12 exhibiting such cracks can remain in service), and a second cluster 46B2 representing nodes corresponding to images where cracks are not acceptable (and a component 12 exhibiting such cracks should not remain in service). Although only two clusters 46B1, 46B2 are shown in FIG. 2B, it is understood that this is only an example and that any number of clusters 46 could be used. The VAE 32B includes a first half 41A2 (encoder) disposed between input layer 36B and the bottleneck 41B, and include a second half 41B2 (decoder) disposed between the bottleneck 41B and the output layer 32B.

Figure 3:
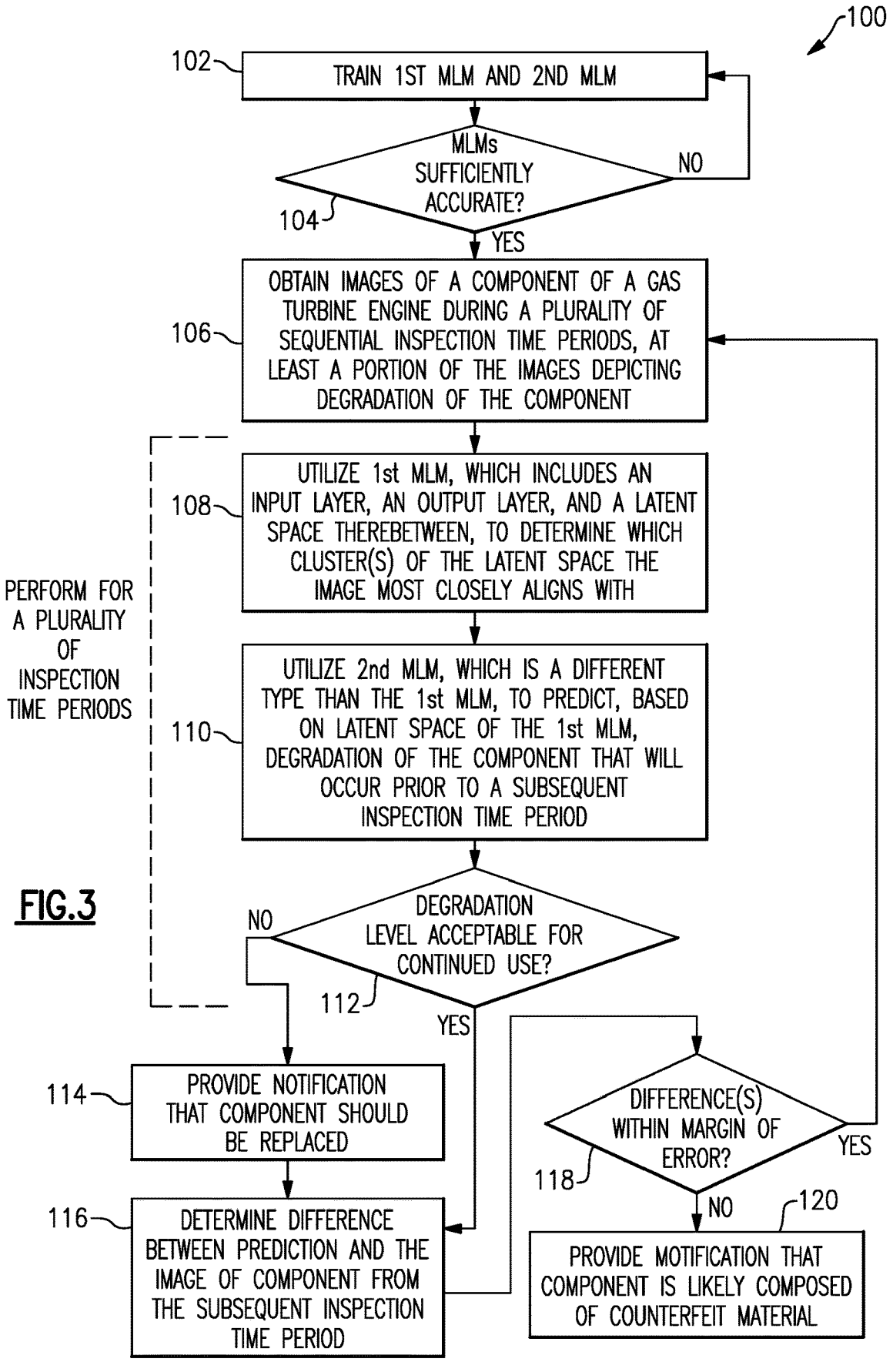
FIG. 3 is a flowchart of an example method of analyzing and predicting degradation of a component of a gas turbine engine and determining if the component is likely made from a counterfeit material.

FIG. 3 is a flowchart of an example method 100 of analyzing and predicting degradation of the component 12 of a gas turbine engine and determining if the component 12 is likely made from a counterfeit material. The method 100 may be performed by the computing device 20. The first MLM 28 and the second MLM 30 are created and trained with historical training data of a plurality of gas turbine engine components (step 102). Creating the MLMs 28, 30 involves includes data gathering and training. In the data gathering, sequential time-based images are gathered of one or more representative components of a same type as the component 12 (e.g., turbine blades) that experience similar representative loading conditions. For the training, the first MLM 28 is trained to take in image data and predict a response to the image data by recreating physical phenomena (e.g., crack propagation), and the second MLM 30 samples the latent space of the first MLM 28 and is trained to take in a sequential latent space inputs and predict future physical responses. The MLMs 28, 30 are then validated by determining if the MLMs 28, 30 are sufficiently accurate (step 104).

Subsequent steps in the method 100 involve use of an acceptable "margin of error," which may be defined during the model validation process (such that the margin of error will be predefined by the time it is used in step 118). As will be described below, the margin of error is used to determine if a particular gas turbine engine component 12 is likely made of a counterfeit material.

If the MLMs 28, 30 are sufficiently accurate (a "yes" to step 104) and are thereby considered validated, the method proceeds to step 106, where images 16 of the component 12 are obtained for a plurality of sequential inspection time periods, with at least some of the images depicting degradation of the component 12. This may include the computing device 20 receiving the images 16 and/or controlling the imaging device 14 to record the images. For a plurality of the inspection time periods, steps 108-112 and 116-118 (described in more detail below) are performed. In one or more embodiments, in step 104 the determination of whether the MLMs 28, 30 are sufficiently accurate is determined based on the extent to which the MLMs 28, 30 exhibit type I errors (MLM indicates part should be preemptively replaced early or that part is likely counterfeit, but it actually was a perfectly acceptable part) and/or type II errors (MLM indicates a part should be accepted it actually should be have been preemptively replaced early or was it actually was made of counterfeit materials). In one or more embodiments, the determination is based on whether the MLMs 28, 30 exhibit more than a predefined quantity of errors (type I and/or type II), with more errors than the predefined quantity corresponding to a "no" to step 104, and less errors than the predefined quantity corresponding to a "yes" to step 104.

In step 108, the first MLM 28, which includes an input layer 36, an output layer 38, and a latent space 40 therebetween, is used to determine which cluster(s) 46 of the first MLM 28 the image from the inspection time period most closely aligns with. In one or more embodiments, the first half 43A (encoder) but not the second half 43B (decoder) of the VAE 32 are used to determine which one or more of the clusters of the latent space 40 the image most closely aligns with.

In step 110, the second MLM 30, which is a different type of MLM than the first MLM 28 and instead predicts time-based sequences, is utilized to predict, based on sampling the latent space 40 of the first MLM 28, a degradation of the component 12 that will occur prior to a subsequent one of the inspection time periods.

In one or more embodiments, the prediction of step 110 predicts a location in the latent space 40 that represents a predicted condition of the component 12 part during said subsequent one of the inspection time periods, and the second half 43B of the VAE 32 is used to generate an image depicting the predicted condition based on the location in the latent space 40.

In one or more embodiments, step 110 uses a rolling window of images including that of a current inspection time period and the n preceding inspection time periods, to make the prediction, where n is defined by the number of images required by the input shape of MLM 30. If less than n images are available, predictions can still be made by "padding" the input (typically with zeros) until its shape matches required input shape of MLM 30. In one or more embodiments, n is at least 10. In one or more embodiments, n is 10.

In step 112, a determination is made of the component 12 could still be used if the predicted degradation from step 110 occurs (e.g., according to one or more predefined accept-ability criteria, which may be related to crack size and propagation). If use would still be acceptable, the method proceeds to step 116 (discussed below).

Otherwise, if the degradation level is not acceptable for continued use (a "no" to step 112), a notification is provided that the component 12 should be preemptively replaced (step 114).

In step 116, a determination is made of one or more differences between the degradation predicted degradation from step 112 and the image of the component 12 from a subsequent inspection time period.

The difference(s) are compared to the margin of error discussed above (step 118), and if the difference(s) are outside the margin of error (a "no" to step 118), then a determination is made that the component is likely made of a counterfeit material, and a notification is provided that the component is likely composed of the counterfeit material (step 120). If the difference(s) are within the margin of error, the method 100 proceeds back to step 108.

For steps 116-118, differences above the acceptable mar-gin of error indicate the component 12 warrants inspection to determine if it is made from counterfeit materials.

The margin of error calculation of step 118 may be a function of simple metrics and/or statistical methods, for example. Examples of simple metrics include: loss, error, or distance metrics. An example of a statistical method may be seeing where the next predicted image is expressed as a percentile of a distribution of predicted images created by adding small random noise to the input images, for example.

Below, the steps 108-118 are referred to as an "iteration" of the method 100.

As indicated above, a material is considered "counterfeit" if the material is claimed to meet, but does not meet, all of the materials requirements for a component. For example, a counterfeit material may meet the requirements for ultimate yield strength, but may have an ultimate tensile strength less than the material specification. In the past, there have been multiple recalls, unscheduled aircraft groundings, and unplanned inspections due to counterfeit titanium in the aerospace industry.

Although steps 116-120 are depicted in FIG. 3 as occur-ring regardless of whether the answer to step 12 is "yes or "no," it is understood that in one or more embodiments, a "yes" to step 112 may instead proceed to step 108 instead of proceeding to step 116 as shown.

Figure 4A:
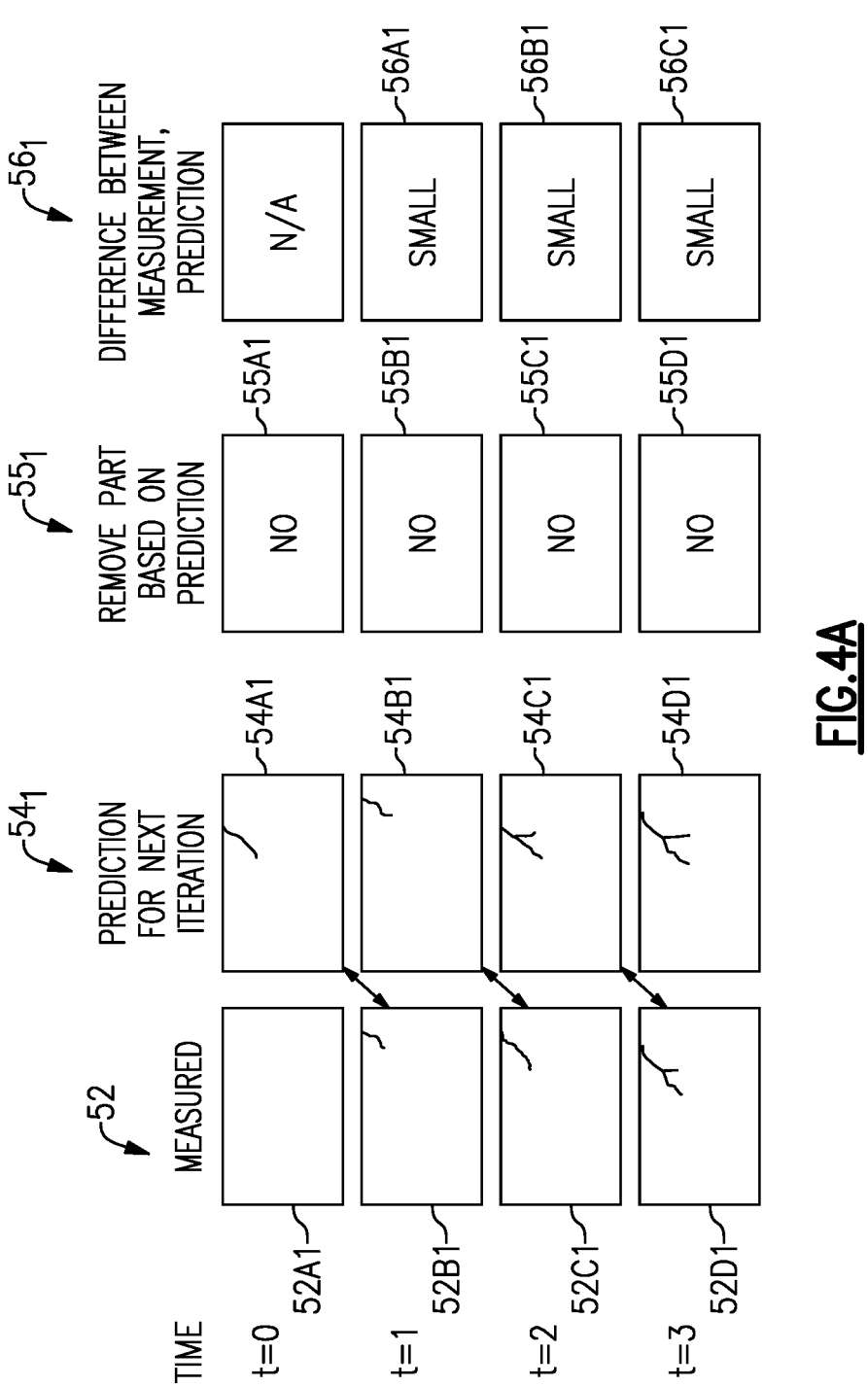
FIG. 4A is a schematic view of a first set of example measurements and predictions for degradation of the component of FIG. 1.

FIG. 4A is a schematic view of a first set of example measurements 52 (corresponding to images 16) and predic-tions 54 for degradation of the component 12 of FIG. 1, assessments 55 of whether the component 12 should be preemptively be replaced based on predicted degradation (corresponding to steps 110-112 of FIG. 3), also differences 56 between the measurements and predictions (correspond-ing to step 118 of FIG. 3). In FIG. 4A (and also FIGS. 4B and 4C), the component 12 is initially assumed to an acceptable component that is not made from counterfeit materials and does not need to be preemptively replaced. Each time period 0, 1, 2, etc. relates to a sequence of inspection time periods, which may be scheduled according to flight hours, for example. Although only four iterations are shown, it is understood that any number of iterations could be performed (e.g., many more than four).

At time t=0, measurement 52A1 of the component 12 is made, and the first MLM 28 and second MLM 30 are used to make prediction 54A1 of how degradation of the com-ponent 12 may appear prior to a subsequent inspection period (t=1). The prediction 54A1 is compared against the limits for acceptable degradation to determine if the com-ponent should be preemptively removed and replaced (cor-responding to step 112). The prediction 54A1 is within degradation limits, so a determination 55A1 is made that the component 12 can remain in service and does not need to be preemptively removed and replaced. Because there is no preceding prediction for comparison, no difference is deter-mined between the measurement and any preceding predic-tion (see "n/a" block of FIG. 4A).

At time t=1, measurement 52B 1 of the component 12 is made, and the first MLM 28 and second MLM 30 are used to make prediction 54B1 of how degradation of the com-ponent 12 may appear prior to a subsequent inspection period (t=2). The prediction 54B1 is compared against the limits for acceptable degradation to determine if the com-ponent 12 should be preemptively removed and replaced (corresponding to step 118 of FIG. 3). The prediction 54B1 is within degradation limits, so a determination 55B1 is made that the component 12 can remain in service and does not need to be preemptively removed and replaced. Also, a difference is determined between the measurement 52B1 (time t=1) and the prediction 54A1 from the preceding inspection time period (time t=0), which leads to a difference determination 56A1 of "small" (a "yes" to step 118) accord-ing to one or more comparison criteria. Thus, no inference is made that the component 12 is likely made of a counterfeit material.

At time t=2, measurement 52C1 of the component 12 is made, and the first MLM 28 and second MLM 30 are used to make prediction 54C1 of how degradation of the com-ponent 12 may appear prior to a subsequent inspection period (t=3). The prediction 54C1 is compared against the limits for acceptable degradation to determine if the com-ponent 12 should be preemptively removed and replaced (corresponding to step 112). This prediction is within deg-radation limits, so a determination 55C1 is made that the component 12 can remain in service and does not need to be preemptively removed and replaced. Also, a difference is determined between the measurement 52C1 (time t=2) and the prediction 54B1 (time t=1), which leads to a difference determination 56B1 of "small" (a "yes" to step 118) according to one or more comparison criteria. Thus, no inference is made that the component 12 is likely made of a counterfeit material.

At time t=3, measurement 52D1 is made, and first MLM 28 and second MLM 30 are used to make prediction 54D1 of how degradation of the component 12 may appear prior to a subsequent inspection period (t=4, which is not shown). The prediction 54D1 is compared against the limits for acceptable degradation to determine if the component 12 should be preemptively removed and replaced (corresponding to step 112). This prediction is within degradation limits, so a determination 55D1 is made that the component 12 can remain in service and does not need to be proactively removed and replaced. Also, a difference is determined between the measurement 52D1 (time t=3) and the prediction 54C1 (time t=2), which leads to a difference determination 56C1 of "small" (a "yes" to step 118) according to one or more comparison criteria. The method 100 may then proceed for further iterations.

Figure 4B:
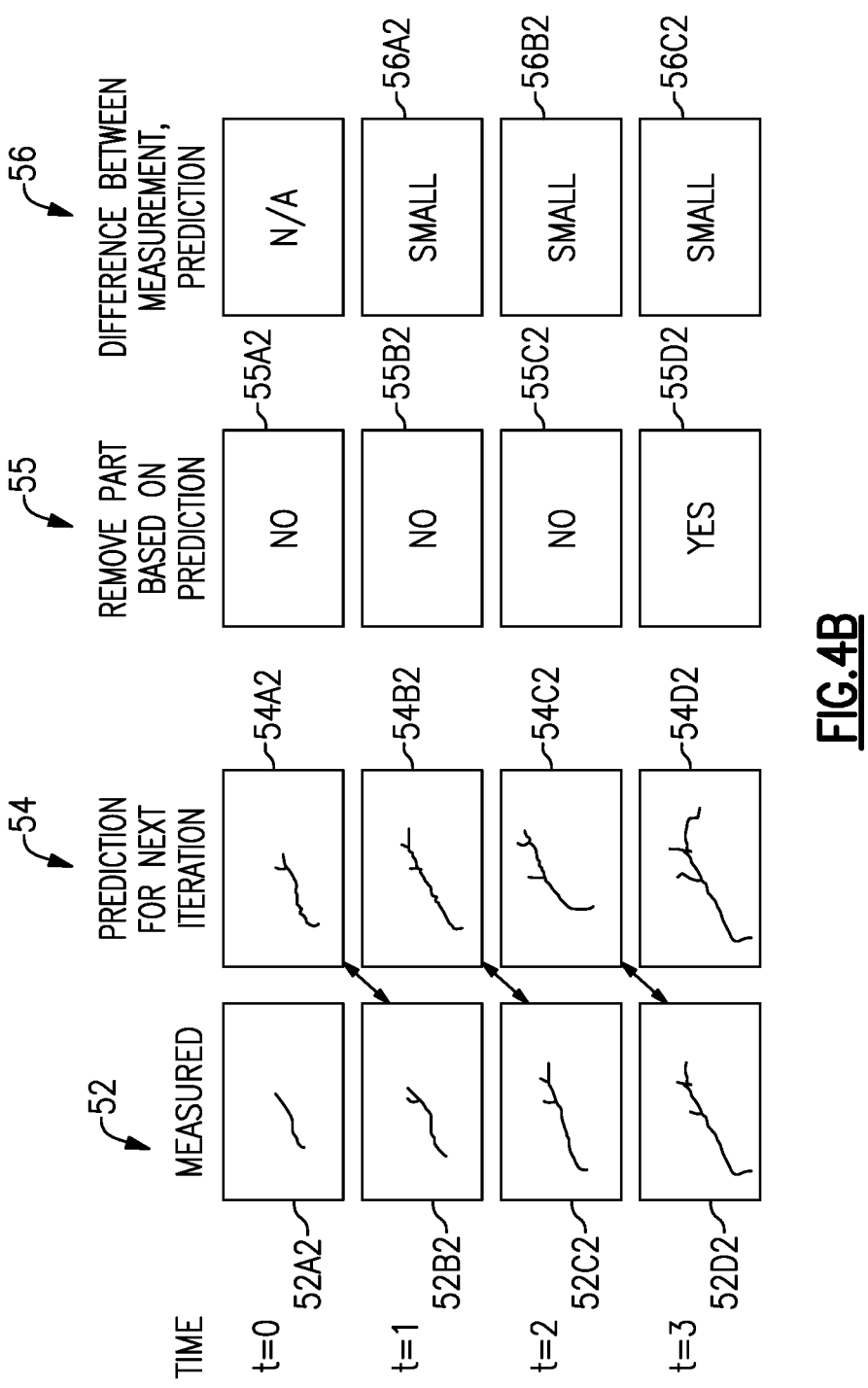
FIG. 4B is a schematic view of a second set of example measurements and predictions for degradation of the component of FIG. 1.

FIG. 4B is a schematic view of a second set of example measurements 52 (i.e., measurements 52A2, 52B2, 52C2, 52D2) corresponding to images 16 and predictions 54 (i.e., predictions 54A2, 54B2, 54C2, 54D2) for degradation of the component of FIG. 1, assessments 55 (i.e., 55A2, 55B2, 55C2, 55D2) of whether the component 12 should be preemptively removed and replaced based on predicted degradation (corresponding to steps 110-112 of FIG. 3), and also differences 56 (i.e., 56A2, 56B2, 56C2) between the measurements and predictions (corresponding to step 118 of FIG. 3). FIG. 4B uses the same numbering scheme as FIG. 4A, although it has different underlying measurements 52, predictions 54, and differences 56. In the example of FIG. 4B, assessment 55D2 indicates that the component 12 should be removed because its degradation level is not acceptable for continued use (a "no" to step 112).

Figure 4C:
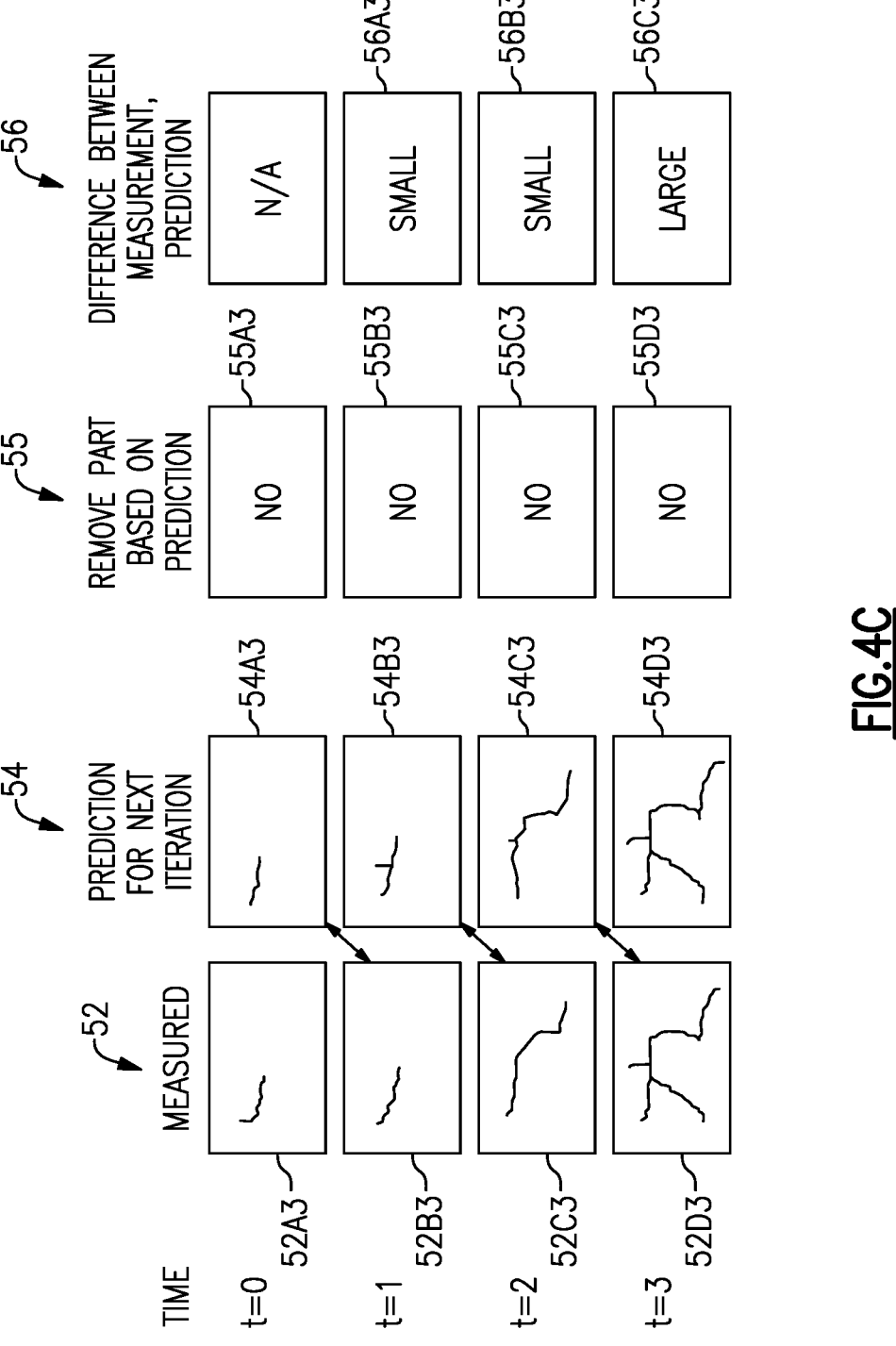
FIG. 4C is a schematic view of third set of example measurements and predictions for degradation of the component of FIG. 1.

FIG. 4C is a schematic view of third set of example measurements 52 (i.e., measurements 52A3, 52B3, 52C3, 52D3) corresponding to images 16 and predictions 54 (i.e., predictions 54A3, 54B3, 54C3, 54D3) for degradation of the component of FIG. 1, assessments 55 (i.e., 55A3, 55B3, 55C3, 55D3) of whether the component 12 should preemptively be replaced based on predicted degradation (corresponding to steps 110-112 of FIG. 3, and also differences 56 (i.e., 56A3, 56B3, 56C3) between the measurements and predictions (corresponding to step 118 of FIG. 3). FIG. 4C uses the same numbering scheme as FIGS. 4A and 4B, although it has different underlying measurements, predictions, and differences. In the example of FIG. 4C, the differences for time t=3 leads to "large" determinations (i.e., a "no" to step 118), and a corresponding inference/assumption that the component 12 is likely made of a counterfeit material. As a result of the difference for time t=3, the component 12 may be preemptively removed from service and may be cut into samples and subjected to destructive material testing to assess whether the component 12 is actually made of counterfeit materials.

The techniques discussed herein are superior to FEA because they can predict future measurements, and because they are not dependent on the physics models/materials constants that FEA is dependent on, and which may prove to be inaccurate in the case of counterfeit materials.

Although crack growth and turbine blades are discussed above, it is understood that this is only one type of gas turbine engine component 12 that may be analyzed, and that the techniques discussed herein are not limited to turbine blade analysis or degradation due to crack growth. For example, thermal degradation of a gas turbine engine combustor could be analyzed. Also, non-gas turbine engine components could be analyzed.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method for a component of a gas turbine engine, comprising:
   obtaining images of a component of a gas turbine engine for a plurality of sequential inspection time periods, at least a portion of the images depicting degradation of the component;
   for a plurality of the inspection time periods:
   utilizing a first machine learning model (MLM), which includes an input layer, an output layer, and a latent space therebetween that includes a plurality of clusters of nodes corresponding to respective image features, to determine which one or more of the clusters of the latent space the image most closely aligns with;
   utilizing a second MLM, which is a different type of MLM than the first MLM, to predict, based on the latent space of the first MLM, a degradation of the component that will occur prior to a subsequent one of the inspection time periods;
   determining a difference between the prediction and the image of the component from said subsequent one of the inspection time periods; and
   providing a notification to a user based on the difference.

2. The method of claim 1, wherein:
   the first MLM includes a bottleneck, an encoder portion, and a decoder portion, with the encoder portion being disposed between the input layer and the bottleneck, and the decoder portion being disposed between the bottleneck and the output layer; and
   said utilizing the first MLM comprises utilizing the encoder portion, but not the decoder portion, to determine which one or more of the clusters of the latent space the image most closely aligns with.

3. The method of claim 2, wherein:
   said utilizing the second MLM to predict the degradation comprises predicting a location in the latent space that represents a predicted condition of the component during said subsequent one of the inspection time periods.

4. The method of claim 3, wherein the method comprises:
   using the decoder portion of the first MLM to generate an image depicting the predicted condition based on said location in the latent space.

5. The method of claim 1, wherein said utilizing the second MLM comprises, for a particular inspection time period, utilizing the image for the particular inspection time period and the images from n preceding inspection time periods to predict the degradation that will occur prior to said subsequent one of the inspection time periods, where n is greater than or equal to 1.

6. The method of claim 1, comprising:
   determining, based on one or more of the differences, whether the component is likely composed of a counterfeit material;
   wherein the notification comprises a notification of whether the component is likely composed of a counterfeit material.

7. The method of claim 6, wherein said determining, based on one or more of the differences, whether the component is likely composed of a counterfeit material, comprises:

determining that a first plurality of the differences for a first subset of the inspection time periods are within a predefined margin error; and determining that a difference determined for one of the inspection time periods that is subsequent to the first subset of inspection time periods is outside the predefined margin of error.

8. The method of claim 1, comprising:

determining, based on one or more of the predictions, whether the component should be preemptively removed from the gas turbine engine;

wherein the notification comprises a notification of whether the component should be preemptively removed from the gas turbine engine.

9. The method of claim 8, wherein:

the first MLM comprises a variational autoencoder; and the second MLM comprises a long short term memory (LSTM) model.

10. The method of claim 1, wherein the degradation comprises one or both of crack formation and crack propagation.

11. A system for analyzing degradation of a component of a gas turbine engine, comprising:

processing circuitry operatively connected to memory, the processing circuitry configured to:

obtain images of a component of a gas turbine engine for a plurality of sequential inspection time periods, at least a portion of the images depicting degradation of the component; and for a plurality of the inspection time periods:

utilize a first machine learning model (MLM), which includes an input layer, an output layer, and a latent space therebetween that includes a plurality of clusters of nodes corresponding to respective image features, to determine which one or more clusters of the latent space the image most closely aligns with;

utilize a second MLM, which is a different type of MLM than the first MLM, to predict, based on the latent space of the first MLM, a degradation of the component that will occur prior to a subsequent one of the inspection time period;

determine a difference between the prediction and the image of the component from said subsequent one of the inspection time periods; and provide a notification to a user based on the difference.

12. The system of claim 1, wherein:

the first MLM includes a bottleneck, an encoder portion, and a decoder portion, with the encoder portion being disposed between the input layer and the bottleneck, and the decoder portion being disposed between the bottleneck and the output layer; and the processing circuitry is configured to utilize the encoder portion, but not the decoder portion, to determine which one or more of the clusters of the latent space the image most closely aligns with.

13. The system of claim 12, to utilize the second MLM to predict the degradation, the processing circuitry is configured to:

predict a location in the latent space that represents a predicted condition of the component during said subsequent one of the inspection time periods.

14. The system of claim 13, wherein the processing circuitry is configured to:

use the decoder portion of the first MLM to generate an image depicting the predicted condition based on said location in the latent space.

15. The system of claim 11, wherein to utilize the second MLM to predict the degradation, the processing circuitry is configured to, for a particular inspection time period, utilize the image for the particular inspection time period and the images from n preceding inspection time periods to predict the degradation that will occur prior to said subsequent one of the inspection time periods, where n is greater than or equal to 1.

16. The system of claim 11, wherein the processing circuitry is configured to:

determine, based on one or more of the differences, whether the component is likely composed of a counterfeit material;

wherein the notification comprises a notification of whether the component is likely composed of a counterfeit material.

17. The system of claim 16, wherein to determine, based on one or more of the differences, whether the component is likely composed of a counterfeit material, the processing circuitry is configured to:

determine that a first plurality of the differences for a first subset of the inspection time period are within a predefined margin error; and determine that a difference determined for one of the inspection time periods that is subsequent to the first subset of inspection time periods is outside the predefined margin of error.

18. The system of claim 11, wherein the processing circuitry is configured to:

determine, based on one or more of the predictions, whether the component should be preemptively removed from the gas turbine engine;

wherein the notification comprises a notification of whether the component should be preemptively removed from the gas turbine engine.

19. The system of claim 18, wherein:

the first MLM comprises a variational autoencoder; and the second MLM comprises a long short term memory (LSTM) model.

20. The system of claim 11, wherein the degradation comprises one or both of crack formation and crack propagation.

* * * * *